(12) United States Patent
Imoto et al.

(10) Patent No.: US 12,199,792 B2
(45) Date of Patent: Jan. 14, 2025

(54) INSPECTION APPARATUS AND INSPECTION METHOD

(71) Applicant: HONDA MOTOR CO., LTD., Tokyo (JP)

(72) Inventors: Tsuyoshi Imoto, Tokyo (JP); Naoki Kawahara, Tokyo (JP); Daiki Yagihara, Tokyo (JP); Taketoshi Uno, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 47 days.

(21) Appl. No.: 18/147,460

(22) Filed: Dec. 28, 2022

(65) Prior Publication Data

US 2023/0231739 A1  Jul. 20, 2023

(30) Foreign Application Priority Data

Jan. 18, 2022  (JP) .................................. 2022-005804

(51) Int. Cl.
*H04L 12/40* (2006.01)

(52) U.S. Cl.
CPC .................. *H04L 12/40039* (2013.01); *H04L 2012/40215* (2013.01); *H04L 2012/40273* (2013.01)

(58) Field of Classification Search
None
See application file for complete search history.

(56) References Cited

U.S. PATENT DOCUMENTS

| | | | |
|---|---|---|---|
| 10,328,874 B2 * | 6/2019 | Haga | G08G 1/0965 |
| 2005/0143879 A1 * | 6/2005 | Yasuda | G05B 23/0221 701/22 |
| 2013/0139018 A1 | 5/2013 | Takada et al. | |
| 2017/0272451 A1 * | 9/2017 | Wakita | H04L 12/40013 |
| 2019/0221057 A1 * | 7/2019 | Shibata | H04W 4/48 |

FOREIGN PATENT DOCUMENTS

JP  5717240 B2  5/2015

* cited by examiner

*Primary Examiner* — Farley Abad
*Assistant Examiner* — Dayton Lewis-Taylor
(74) *Attorney, Agent, or Firm* — WHDA, LLP

(57) ABSTRACT

An inspection apparatus, which inspects a CAN communication function of an ECU, comprises: a connection unit which connects a communication circuit of the ECU and the inspection apparatus on a one-to-one basis; a creation unit which creates an inspection message in which a predetermined signal level is set in a confirmation field of a data format corresponding to a message received from the ECU; a transmission unit which transmits the inspection message to the ECU; a reception unit which receives a response message to the inspection message from the ECU; a confirmation unit which confirms whether a signal level of the confirmation field in the response message is changed with respect to setting of the inspection message; and a determination unit which determines whether a reception function of the ECU is normal based on the confirmation.

7 Claims, 10 Drawing Sheets

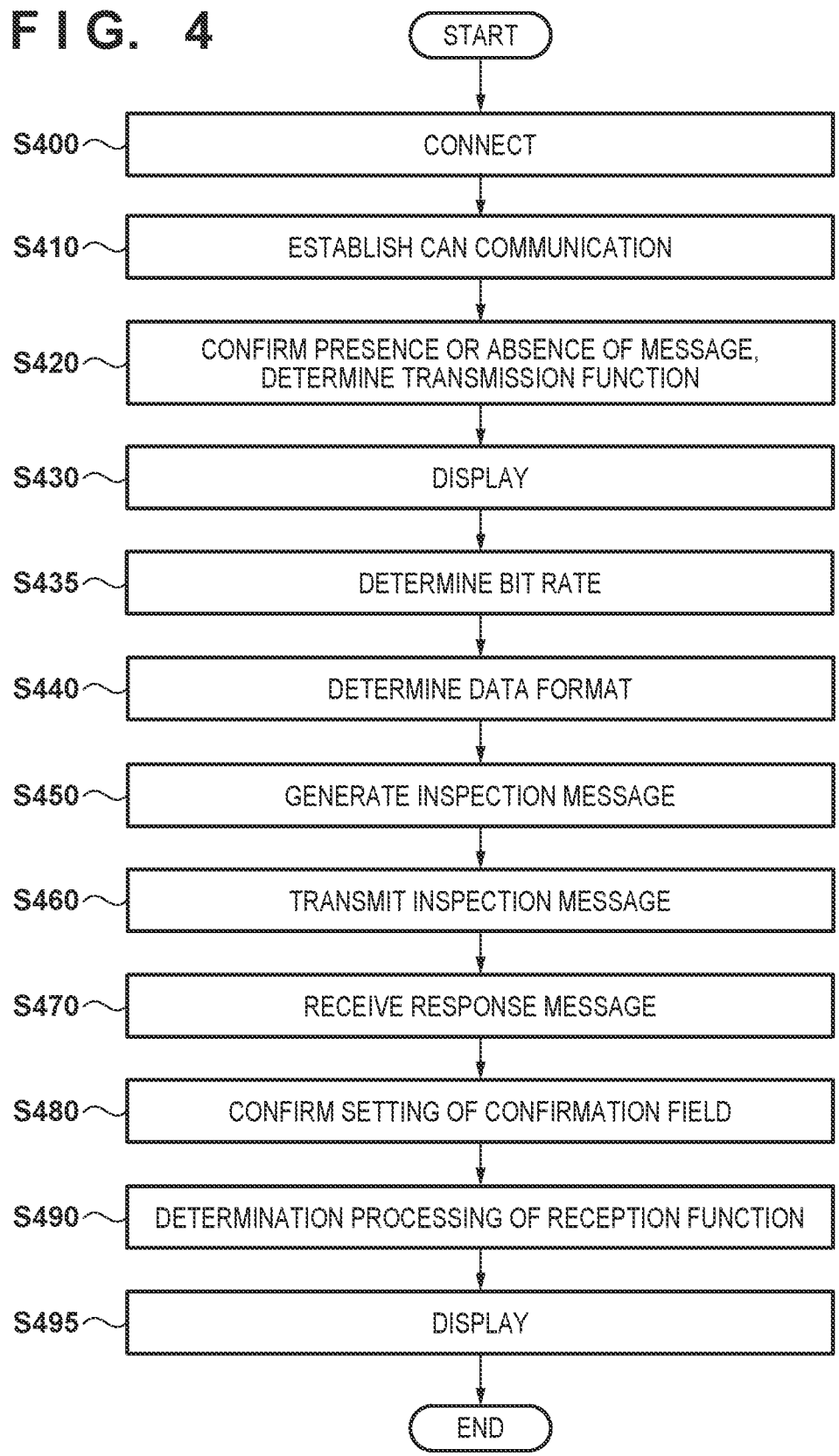

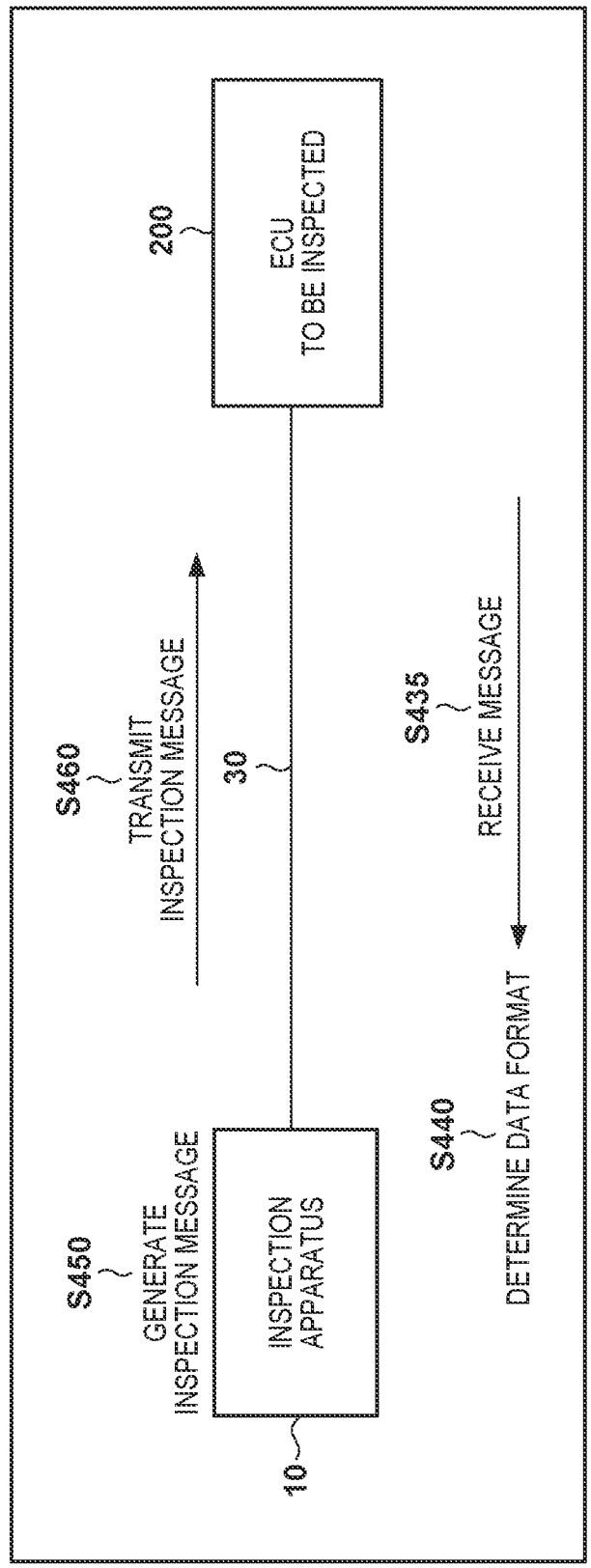

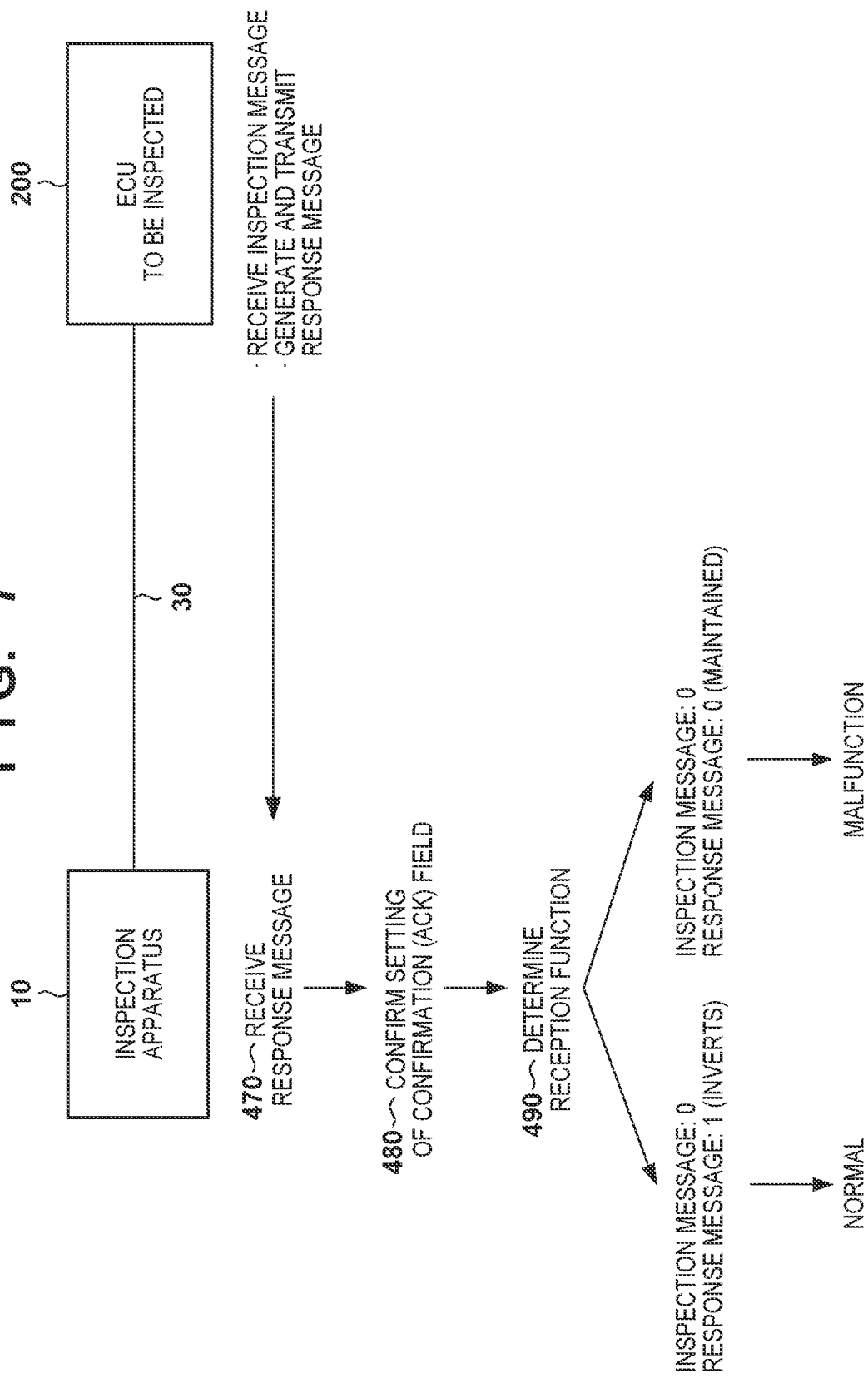

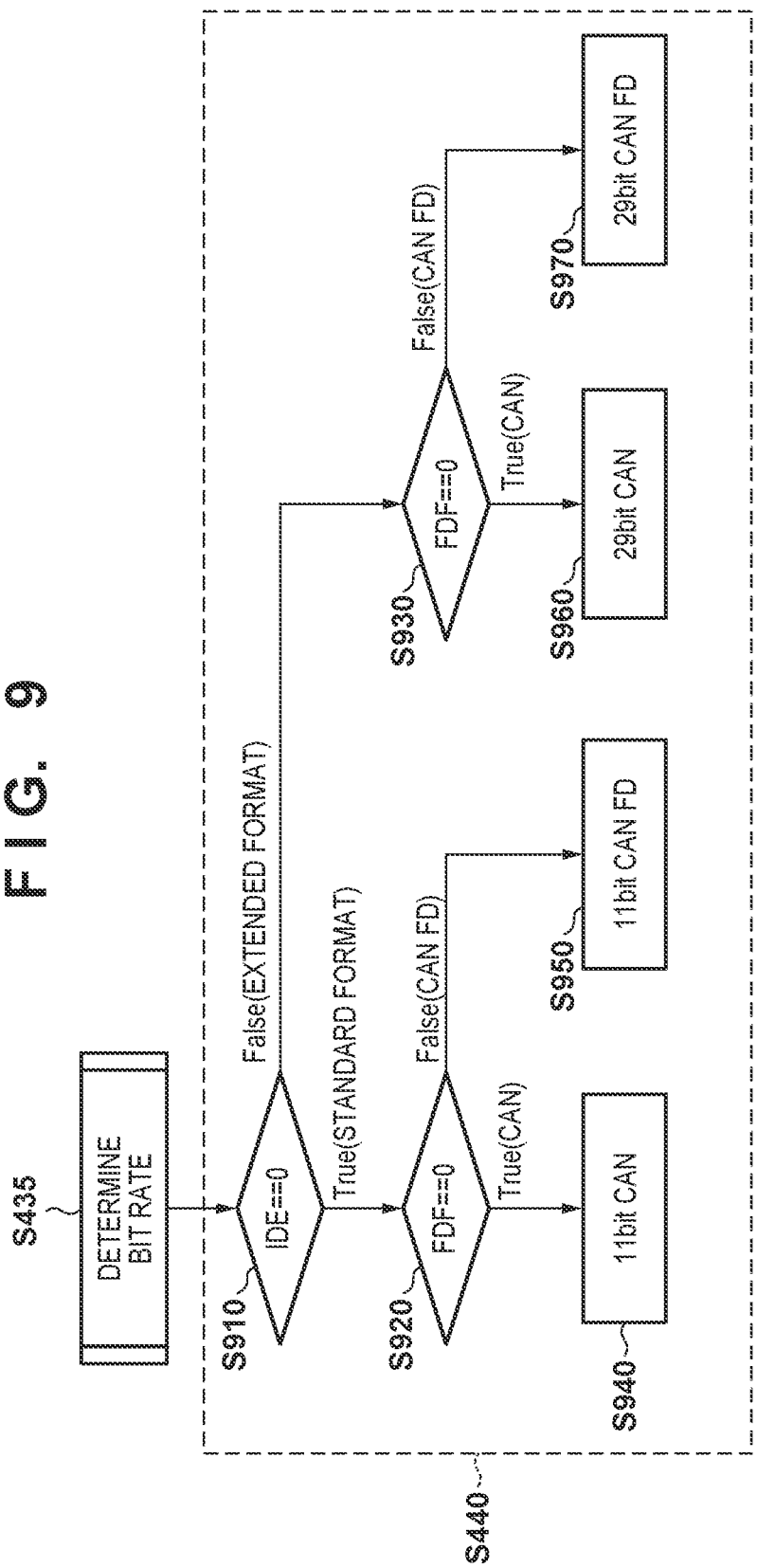

INSPECTION APPARATUS AND INSPECTION METHOD

CROSS-REFERENCE TO RELATED APPLICATION(S)

This application claims priority to and the benefit of Japanese Patent Application No. 2022-005804 filed on Jan. 18, 2022, the entire disclosure of which is incorporated herein by reference.

BACKGROUND OF THE INVENTION

Field of the Invention

The present invention relates to an inspection apparatus and an inspection method.

Description of the Related Art

Conventionally, a plurality of electronic devices are mounted on a vehicle to perform various processes. A plurality of ECUs (Electronic Control Units) are mounted on the vehicle in order to control operations of these electronic devices. In order to operate the plurality of ECUs in cooperation, the ECUs are mutually connected via a network, and data is transmitted and received, so that the ECUs share information, and a CAN (Controller Area Network) is widely adopted as a communication protocol.

Japanese Patent No. 5717240 discloses, as a communication system in which a plurality of ECUs are connected to each other by a common communication line, a communication system in which a plurality of other ECUs receive a message transmitted by one ECU and which generates success/failure information of reception indicating a success/failure of reception of the message and transmits the success/failure information of reception.

Since an IPU (Integrated Power Unit), a DU (Drive Unit), a CHGR (Charger), and the like constituting an electric vehicle cannot perform an internal inspection of a device, in order to identify a defective device, inspection by non-defective replacement is performed in which a normally operating non-defective device is sequentially replaced to confirm whether inspection information is improved.

However, in the inspection in which the non-defective replacement is performed, it is necessary to prepare each expensive device for inspection, and in the inspection work, a predetermined number of work steps are required for device replacement work.

On the other hand, in the communication system disclosed in Japanese Patent No. 5717240, by receiving success/failure information of reception, one ECU can confirm that a message of the own device has been correctly transmitted to any one of the other ECUs. However, it is not possible to determine whether a CAN communication function (reception function) in each of the other ECUs that are message transmission destinations is normal.

In view of the above problem, the present invention provides an inspection technique capable of inspecting a CAN communication function in an ECU to be inspected.

SUMMARY OF THE INVENTION

According to one aspect of the present invention, there is provided an inspection apparatus that inspects a CAN communication function of an ECU to be inspected, the inspection apparatus comprising: a connection unit configured to connect a communication circuit of the ECU and the inspection apparatus on a one-to-one basis, an inspection message creation unit configured to create an inspection message in which a predetermined signal level is set in a confirmation field of a data format corresponding to a message received from the ECU to be inspected; a transmission unit configured to transmit the inspection message to the ECU; a reception unit configured to receive a response message to the inspection message from the ECU; a confirmation unit configured to confirm whether a signal level of the confirmation field in the response message is changed with respect to setting of the inspection message; and a reception function determination unit configured to determine whether a reception function of the ECU is normal based on the confirmation of the confirmation unit.

BRIEF DESCRIPTION OF THE DRAWINGS

FIG. 4 is a diagram for explaining a flow of inspection using the inspection apparatus according to the embodiment;

FIG. 5 is a diagram schematically illustrating a flow from reception of a message to determination of a data format of the message to generation and transmission of an inspection message;

FIG. 7 is a diagram schematically illustrating a flow from reception of a response message to confirmation of a signal level in a confirmation field to determination of a reception function;

FIG. 9 is a diagram for explaining a flow of processing of determining the data format.

DESCRIPTION OF THE EMBODIMENTS

Figure 1:
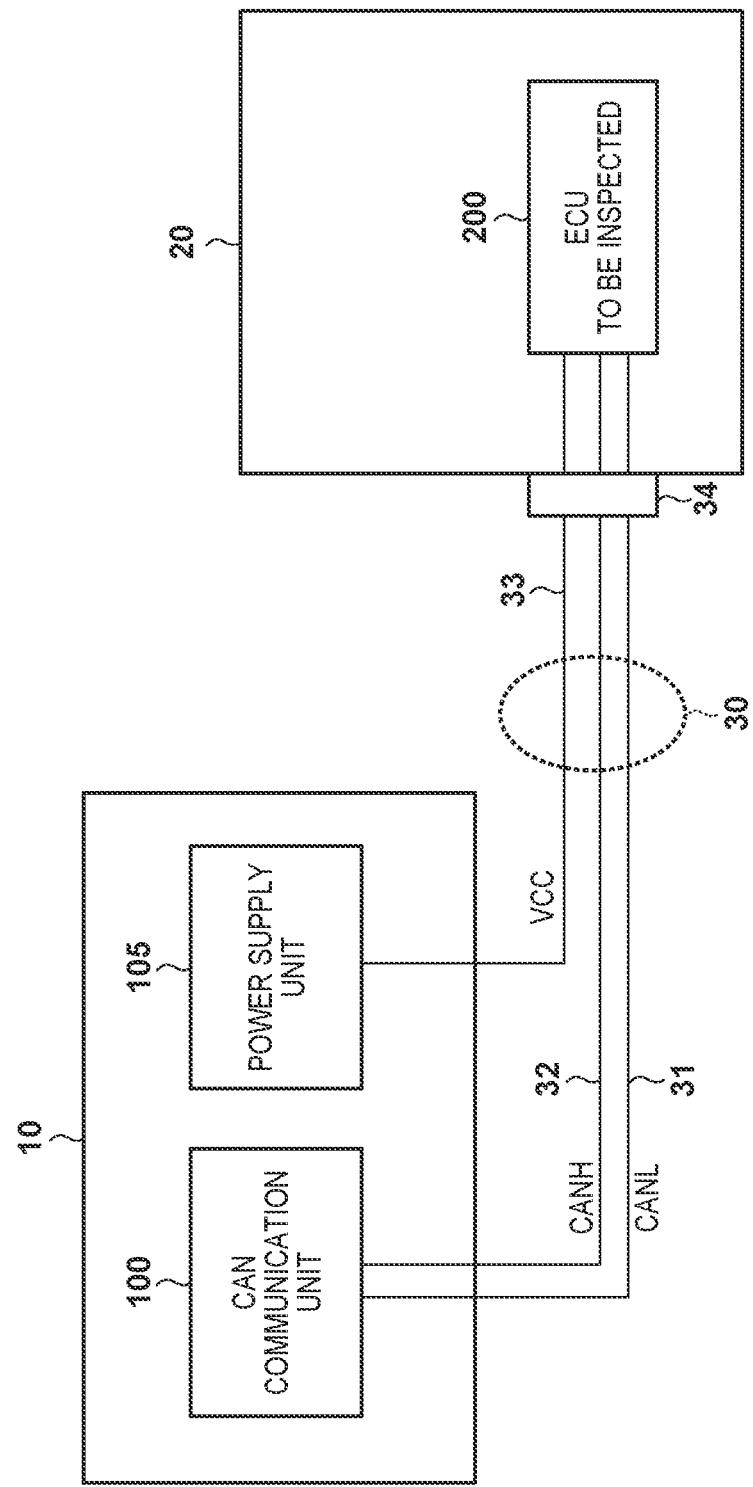
FIG. 1 is a diagram illustrating a schematic configuration of an inspection system including an inspection apparatus according to an embodiment.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

[Schematic Configuration of Inspection System Including Inspection Apparatus 10]

FIG. 1 is a diagram illustrating a schematic configuration of an inspection system including an inspection apparatus 10 according to an embodiment. FIG. 1 exemplarily illustrates an ECU included in a device 20 as an ECU 200 to be inspected. The device 20 may be, for example, an IPU (Integrated Power Unit), a DU (Drive Unit), a CHGR (Charger), or the like. The inspection apparatus 10 according to the present embodiment is an inspection apparatus that inspects a CAN communication function of the ECU 200 to be inspected. The inspection apparatus 10 includes a CAN communication unit 100 and a power supply unit 105.

In a state in which the device 20 such as the IPU or the DU is connected to a CAN in a vehicle, the ECU of each of the devices 20 functions as a communication node; however, in this case, the inspection apparatus 10 and the ECU 200 (communication circuit 210) to be inspected are connected on a one-to-one basis by removing a coupler for CAN connection, and a signal (message) from the ECU 200 to be inspected is confirmed, whereby the CAN communication function in the ECU 200 to be inspected is inspected.

A connection unit 30 is connected to the inspection apparatus 10 (CAN communication unit 100) and the ECU 200 (communication circuit 210) to be inspected on a one-to-one basis via a connection coupler 34. The connection unit 30 includes a CANL 31 and a CANH 32 as bus signal lines for CAN communication.

The power supply unit 105 can supply a power supply voltage VCC converted into a predetermined voltage (for example, 12 V) from an external power supply to the ECU 200 to be inspected via a power supply line 33. The connection unit 30 may include bus signal lines 31 and 32 and the power supply line 33. The supply of the power supply voltage VCC is not limited to the supply from the power supply unit 105, and the power supply voltage VCC may be supplied from the vehicle side to the ECU 200 to be inspected. When the power supply voltage VCC is supplied from the vehicle side, the power supply line 33 is not essential, and the connection unit 30 may include at least the bus signal lines 31 and 32.

[ECU 200 to be Inspected]

Figure 2:
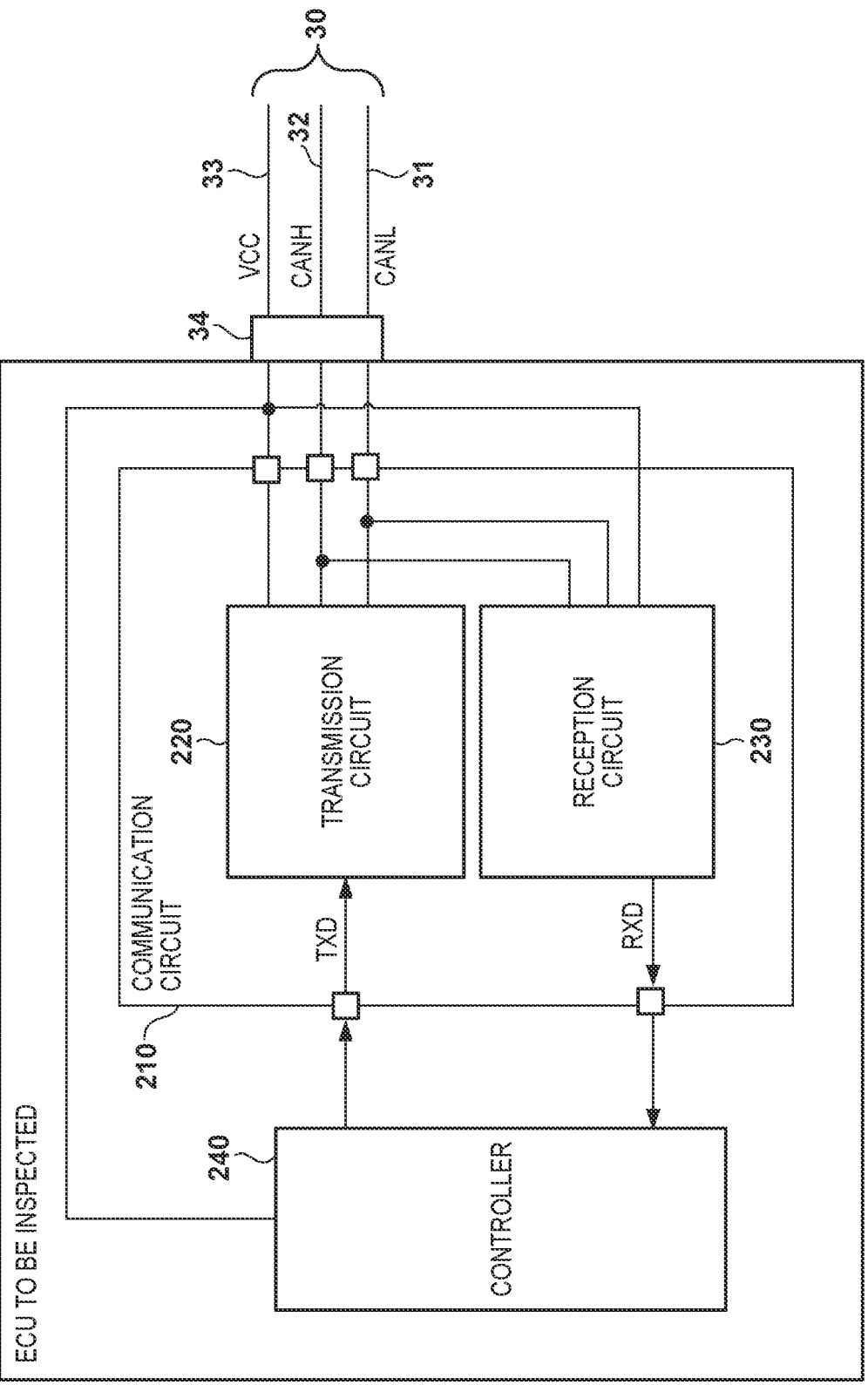
FIG. 2 is a diagram illustrating a circuit configuration example of an ECU to be inspected.

FIG. 2 is a diagram illustrating a circuit configuration example of the ECU 200 to be inspected. The ECU 200 includes a communication circuit 210 and a controller 240. The communication circuit 210 includes a transmission circuit 220 that performs message transmission processing based on a signal output from the ECU 200, and a reception circuit 230 that performs reception processing of a signal (message) received from the outside. The controller 240 is a control unit that comprehensively controls the operations of the transmission circuit 220 and the reception circuit 230 in the communication circuit 210.

The bus signal line 31 (CANL) of the connection unit 30 is a signal line on a low potential side, and the bus signal line 32 (CANH) is a signal line on a higher potential side than the bus signal line 31. The potential is a potential based on a potential of a ground (that is, ground potential) in the inspection apparatus 10.

A transmission signal TXD is input from the controller 240 to the transmission circuit 220, and the transmission circuit 220 outputs a signal (message) generated based on the transmission signal TXD and including a high signal level or a low signal level. The reception circuit 230 converts the signal (message) including the high signal level or the low signal level, which has been received from the bus signal lines 31 and 32, into a reception signal RXD, and outputs the converted reception signal RXD to the controller 240.

In the signal level, the high level corresponds to, for example, a logical value 1 as a data value, and corresponds to a recessive level (CANH: 32) as the potential of the bus signal line. On the other hand, the low level corresponds to, for example, a logical value 0 as the data value, and corresponds to a dominant level (CANL: 31) as the potential of the bus signal line. "Dominant" means a superior signal in the transmission signals of the bus signal lines 31 and 32, and "recessive" means an inferior signal in the transmission signals of the bus signal lines 31 and 32. Specific signal processing inside the ECU 200 is a known technique, and detailed description thereof will be omitted.

[Inspection Apparatus 10]

(Functional Configuration)

Figure 3:
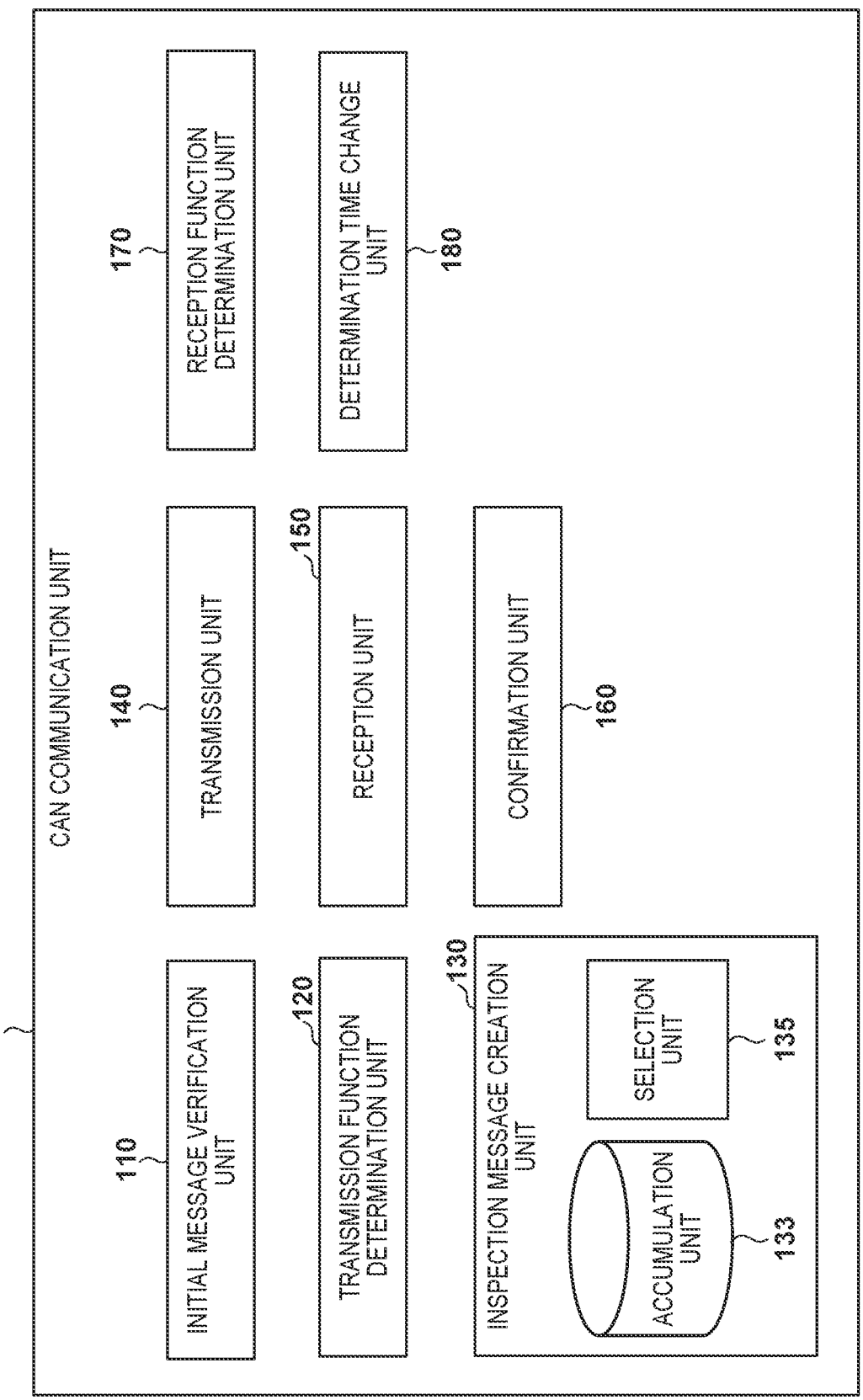
FIG. 3 is a diagram illustrating a functional configuration of the inspection apparatus according to the embodiment.

FIG. 3 is a diagram illustrating a functional configuration of the inspection apparatus 10 according to the present embodiment. The inspection apparatus 10 includes, as functional configurations, an initial message verification unit 110, a transmission function determination unit 120, an inspection message creation unit 130, a transmission unit 140, a reception unit 150, a confirmation unit 160, a reception function determination unit 170, and a determination time change unit 180.

These functional configurations are realized by reading a predetermined computer program stored in a storage medium of the inspection apparatus 10 into a RAM and executing signal processing by a CPU of the inspection apparatus 10. The functional configurations may be configured by an integrated circuit or the like as long as they perform similar functions.

(Setting of Sensitivity Switching Function)

The inspection apparatus 10 according to the present embodiment can switch an inspection determination time between a standard mode and a sensitive mode by a sensitivity changeover switch (not illustrated).

A first determination duration time (for example, 1.5 seconds) in a standard mode is set in accordance with an abnormality detection condition of a standard vehicle. However, there is an aspect that it is difficult to reproduce a failure that may actually occur within a limited inspection time at a repair site. For example, in an unstable state such as solder being almost peeled off, a failure state does not continuously occur, and in the time setting of the standard mode, a phenomenon in which a malfunction state (abnormality) continues may be difficult to detect.

In order to easily detect a continuous malfunction state even for the ECU in an operation state in which the failure state is less likely to continuously occur, the inspection apparatus 10 according to the present embodiment is provided with the sensitive mode capable of performing inspection in a second determination duration time (for example, 0.75 seconds) of the sensitive mode shorter than a signal sampling time in the first determination duration time.

The determination time change unit 180 changes the determination duration time for determining whether the CAN communication function is normal from the first determination duration time (for example, 1.5 seconds) of the standard mode to the second determination duration time (for example, 0.75 seconds) of the sensitive mode shorter than the first determination duration time by the input from the sensitivity changeover switch.

At the time of setting the standard mode, the reception function determination unit 170 determines whether a reception function of the ECU 200 (reception circuit 230) is normal based on the first determination duration time. When the determination time is changed by the determination time change unit 180, that is, when the sensitive mode is set, the reception function determination unit 170 determines whether the reception function of the ECU 200 is normal based on the second determination duration time.

When the malfunction state (abnormality) continues in the determination duration time (first determination duration time, second determination duration time), the reception function determination unit 170 determines that the reception function of the ECU 200 is in the malfunction state.

The switching between the standard mode and the sensitive mode is similarly performed also in the determination processing of a transmission function. That is, at the time of setting the standard mode, the transmission function determination unit 120 determines whether the transmission function of the ECU 200 (transmission circuit 220) is normal based on the first determination duration time. When the determination time is changed by the determination time change unit 180, that is, when the sensitive mode is set, the transmission function determination unit 120 determines whether the transmission function of the ECU 200 is normal based on the second determination duration time. When the malfunction state (abnormality) continues in the determination duration time (first determination duration time, second determination duration time), the transmission function determination unit 120 determines that the transmission function of the ECU 200 is in the malfunction state.

The sensitivity can be switched at any timing by operating the sensitivity changeover switch. For example, when the sensitivity is switched by operating the sensitivity changeover switch at the start or in the middle of the inspection, the determination time change unit 180 can change the setting of the determination time from the first determination duration time to the second determination duration time. Alternatively, the determination time change unit 180 can change the setting of the determination time from the second determination duration time to the first determination duration time.

[Data Format of Inspection Message]

Next, a configuration of a data format of an inspection message created by the inspection message creation unit 130 will be described. The following description is an outline of the data format based on a CAN or CAN FD communication protocol, and the data format is also referred to as a data frame. In the data format (data frame), a region where bitwise data is set is referred to as a field. The data format (data frame) described with reference to FIGS. 6A and 6B is a data format used when an inspection message 600 is transmitted from the inspection apparatus 10 to the ECU 200.

Figure 6A:
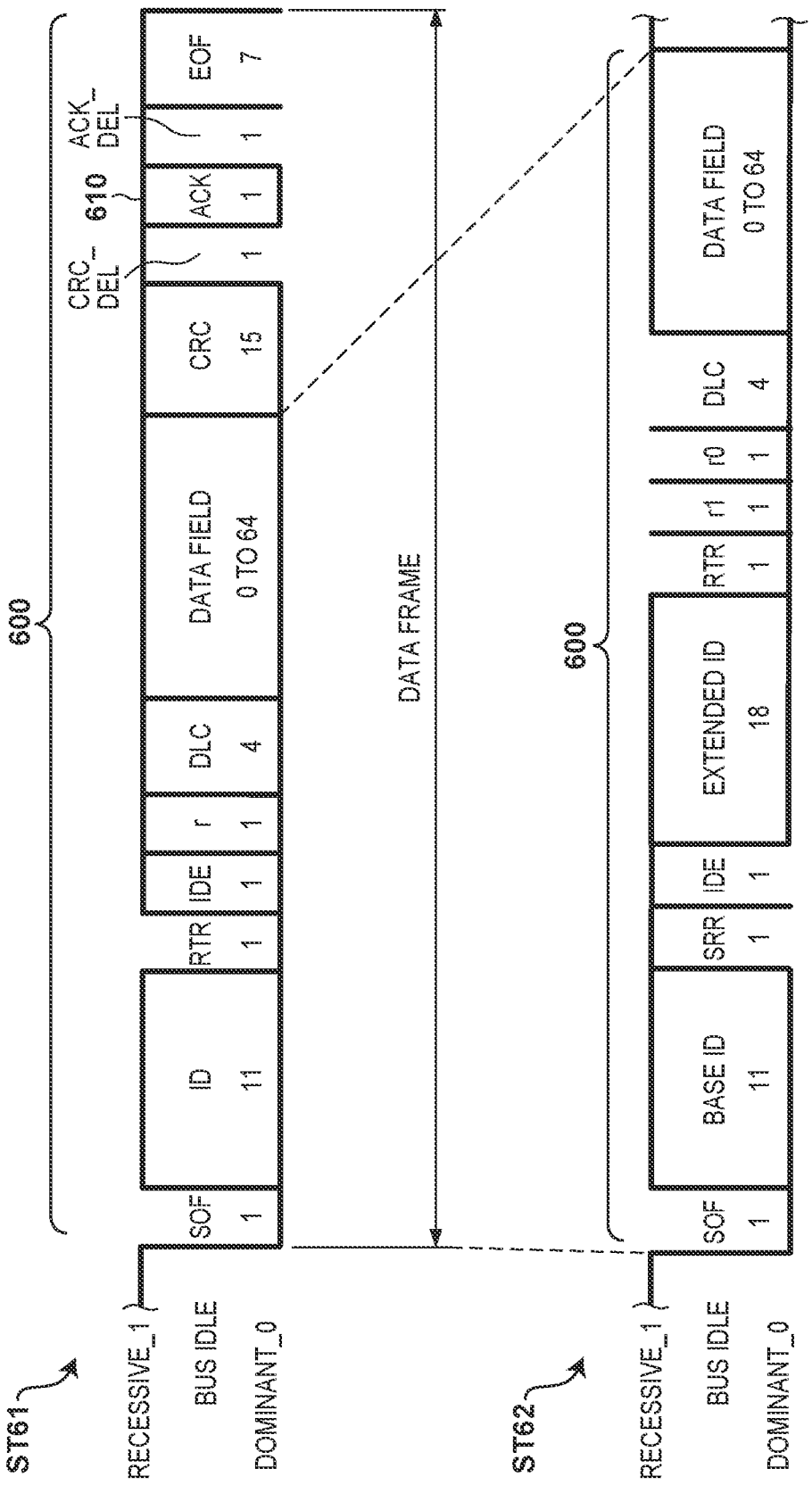
FIG. 6A is a diagram illustrating a configuration example of a data format of the inspection message based on a CAN protocol.
Figure 6B:
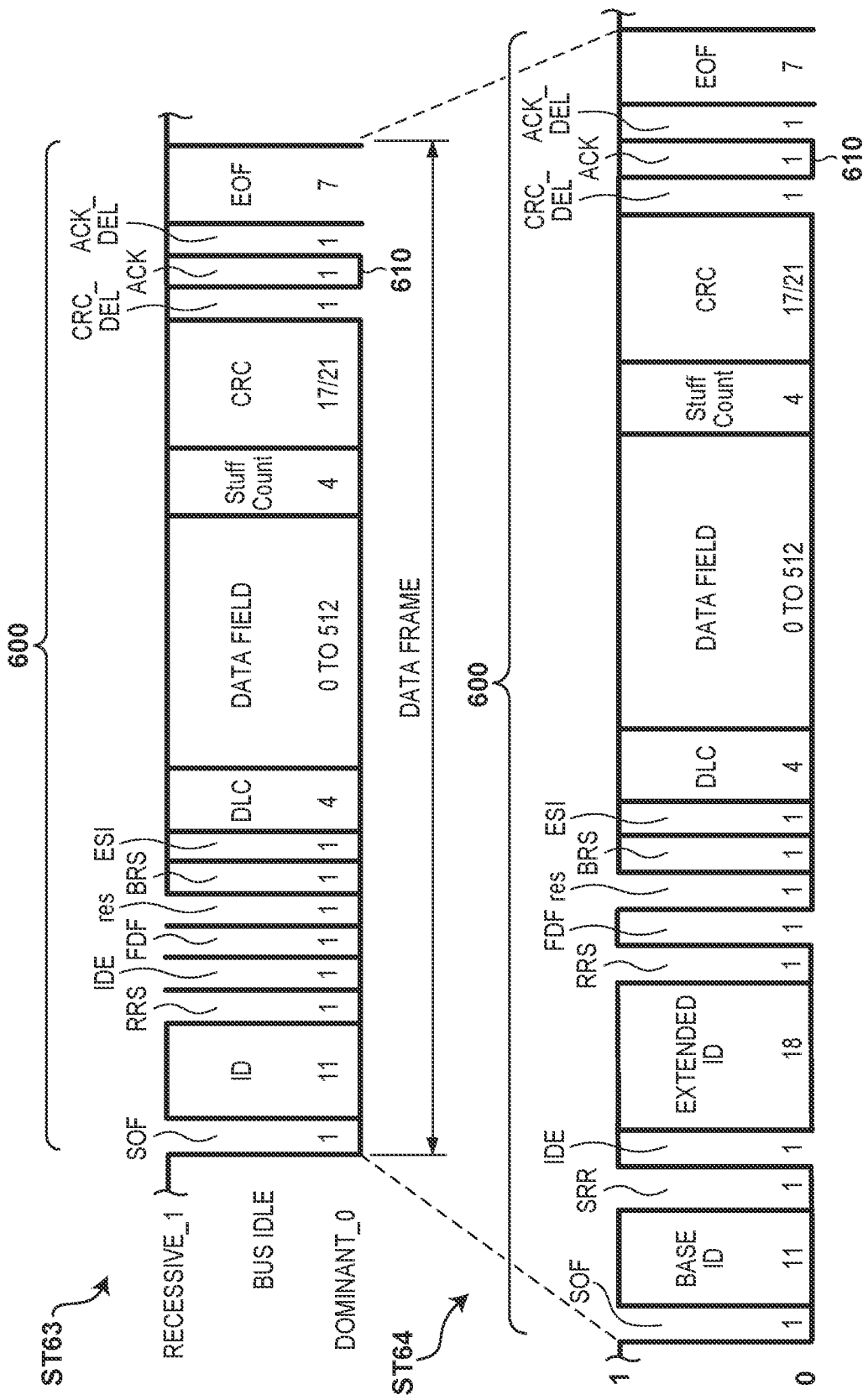
FIG. 6B is a diagram illustrating a configuration example of the data format of the inspection message based on a CAN FD protocol.

FIG. 6A is a diagram illustrating a configuration example of the data format (data frame) of the inspection message 600 based on the CAN protocol, created by the inspection message creation unit 130. FIG. 6B is a diagram illustrating a configuration example of the data format (data frame) of the inspection message based on the CAN FD protocol, created by the inspection message creation unit 130. In FIGS. 6A and 6B, a numerical value of each portion of each data format indicates a length (bit length) of data indicating how many bits are used.

(CAN Standard Format)

In FIG. 6A, an ST 61 indicates a data frame in a standard format based on the CAN protocol, and the ST 62 indicates a data frame in an extended format based on the CAN protocol. In the ST 62, a configuration from an SOF to a data field is partially exemplified, and in the ST 62, a configuration subsequent to the data field is similar to the standard format of the ST 61.

In the ST 61 and the ST 62 of FIG. 6A, an upper line indicates the signal level of the recessive level (logical value 1), and a lower line indicates the signal level of the dominant level (logical value 0). A portion having a line only on the dominant level side indicates dominant fixed data, and a portion having a line only on the recessive level side indicates recessive fixed data. A portion having lines on the both sides indicates data that changes (inverts) to dominant or recessive depending on the transmitted data.

SOF (Start Of Frame) is a field indicating the start of transmission of the data frame. When the signal level of the SOF changes from a bus-idle recessive level (logical value 1) to the dominant level (logical value 0), the ECU 200 to be inspected can synchronize the reception processing.

An ID (identifier) is used to identify data content and a transmitting node, and can be also used to determine a priority order of communication arbitration. In the standard format, an identifier field (ID field) is composed of a 11-bit length.

An RTR (Remote Transmission Request) is a field for identifying the data frame and a remote frame, where the remote frame is a field used for requesting the data frame. The RTR can be used for communication arbitration similarly to the identifier field (ID field).

An IDE is a field used to distinguish between the standard format (for example, 11 bits) and the extended format (for example, 29 bits). In the standard format, a dominant signal (logical value 0) is set in the IDE, and in the extended format, a recessive signal (logical value 1) is set in the IDE.

"r" indicates a reservation bit, and DLC (Data Length Code) is a field indicating how many bytes of data are transmitted in the subsequent data field. The IDE, the reserved bit ("r"), and the DLC are also collectively referred to as a control field.

The data field is a part of data to be transmitted, and is data with a data length set by the DLC. In the data field, all bytes are transmitted by the most significant bit (MSB). The data field has a length of 0 to 8 bytes (0- to (4-bit length), and the length can be set for each byte.

A CRC (Cyclic Redundancy Check) is a field indicating a calculation result of transmission values of the SOF, the ID, the control field, and the data field. For example, the node on the transmission side calculates a transmission value, and sets the calculated transmission value in the CRC. In the node on the reception side, similarly to the transmitting node, reception values of the SOF, the ID, the control field, and the data field are calculated and compared with a CRC setting value, so that it is possible to determine whether the received message (data) has been normally received.

For example, when the node on the transmission side is the ECU 200 to be inspected and the node on the reception side is the inspection apparatus 10, the reception unit 150 of the inspection apparatus 10 can determine whether the received message (data) has been normally received by calculating reception values of the SOF, ID, control field, and data field of the received data and comparing the reception values with the CRC setting value. A CRC_DEL (CRC delimiter) is a field indicating the end of a CRC sequence. The CRC and the CRC_DEL (CRC delimiter) are also collectively referred to as a CRC field.

An ACK (ACKnowledge) is a confirmation field 610 for determining whether data up to the transmitted CRC has been normally received by the reception circuit 230 of a transmission destination node (for example, the ECU 200 to be inspected). The confirmation field is 1 bit length, the node (inspection apparatus 10) on the transmission side transmits the dominant (logical value 0), and when the node (ECU 200) on the reception side has normally received the data up to the CRC field, the node on the reception side transmits acknowledgement of the recessive (logical value 1). When the node on the reception side is malfunctioning, the acknowledgement in which the dominant (logical value 0) is set (maintained) in the confirmation field 610 is transmitted.

An ACK_DEL (ACK delimiter) is a field indicating the end of an ACK field. ACK and ACK_DEL (ACK delimiter) are also collectively referred to as an ACK field. An EOF (End Of Frame) following the ACK_DEL (ACK delimiter) is a field transmitted at the end of the data frame.

(CAN Extended Format)

In the extended format illustrated in the ST 62, a configuration different from the standard format (ST 61) will be described. A base ID is 11 bits length, and the ID in the standard format is referred to as the base ID in the extended format. In the extended format, an SRR (Substitute Remote Request Bit) follows the base ID, and a 1-bit length recessive signal is set. Subsequent to the SRR, the 1-bit length recessive signal (logical value 1) is set in the IDE (Identifier Extension Bit).

In the extended format, the identifier field (ID field) includes a 1-bit length base ID field and an 18-bit length extended ID field. That is, in the extended format, the identifier field (ID field) includes a 29-bit length (=11 bits+18 bits).

A 1-bit dominant signal is set to each reserved bit ("r1", "r0"). The DLC (Data Length Code) is the field indicating how many bytes of data are transmitted in the subsequent data field. The reserved bit ("r1", "r0") and the DLC are also collectively referred to as the control field.

(CAN FD Standard Format)

In FIG. 6B, an ST 63 indicates a data frame in a standard format based on the CAN FD protocol, and the ST 64 indicates a data frame in an extended format based on the CAN FD protocol. In the ST 64, a configuration from the SOF to the data field is different from the standard format of the ST 63, and in the ST 64, a configuration subsequent to the data field is similar to the standard format of the ST 63.

In the ST 63 and the ST 64 of FIG. 6B, an upper line indicates the signal level of the recessive level (logical value 1), and a lower line indicates the signal level of the dominant level (logical value 0). A portion having a line only on the dominant level side indicates dominant fixed data, and a portion having a line only on the recessive level side indicates recessive fixed data. A portion having lines on the both sides indicates the data that changes (inverts) to dominant or recessive depending on the transmitted data.

SOF (Start Of Frame) is a field indicating the start of transmission of the data frame. When the data frame is sent from the node, a portion that is transmitted first is in a dominant state to represent a start of the data frame. When the signal level of the SOF changes from a bus-idle recessive level (logical value 1) to the dominant level (logical value 0), the ECU 200 to be inspected can synchronize the reception processing.

An arbitration region of the CAN FD protocol includes an ID (identifier) and RRS (Remote Request Substitution). Similarly to the CAN protocol, the ID (identifier) is used to identify data content and a transmitting node, and can be also used to determine a priority order of communication arbitration. The RTR (Remote Transmission Request) used in the CAN protocol is replaced with a 1-bit RRS. In the standard format, an identifier field (ID field) is composed of a 11-bit length.

A control region of the CAN FD includes IDE, FDF, res, BRS, ESI, and DLC. In the CAN FD, FDF, BRS, and ESI are added as compared with the CAN protocol. The IDE is similar to the CAN protocol, and is the field used to distinguish between the standard format (for example, 11 bits) and the extended format (for example, 29 bits). In the standard format, a dominant signal (logical value 0) is set in the IDE, and in the extended format, a recessive signal (logical value 1) is set in the IDE. res corresponds to the reservation bit of the CAN protocol, and the DLC (Data Length Code) is the field indicating how many bytes of data are transmitted in the subsequent data field.

An FDF (FD format indicator) is a field used to distinguish between the CAN protocol and the CAN FD protocol. In the CAN protocol, the dominant (=0) is set, and in the case of the CAN FD protocol, the recessive (=1) is set.

The BRS (Bit Rate Switch) is a field for switching a data phase to be speeded up, and the transmission node switches the mode to a clock mode of a fast transfer rate at a sampling point of the BRS. When the mode is switched to the clock mode of a fast transfer rate by the setting of the BRS, also in a responding reception node, the clock mode is similarly switched.

The ESI (Error State Indicator) is a data frame indicating an error state of the transmission node. In an error active state indicating a normal state in which no error has occurred, the dominant is set, and transition is made from error active to error passive when the error counter exceeds a certain value. In an error-passive state, the recessive is set.

The DLC (Data Length Code) is a field indicating how many bytes of data are transmitted in a subsequent data field, and the data field is a portion of the data to be transmitted and is data with a data length set by the DLC. In the data field, all bytes are transmitted by the most significant bit (MSB). Although the data field of the CAN protocol is 0 to 8 bytes length (0 to 64 bits length), in the CAN FD protocol, data of up to 64 bytes can be transmitted, and 0 to 8, 12, 16, 20, 24, 32, 48, and 64 bytes can be selected as the data length.

A CRC (Cyclic Redundancy Check) region of the CAN FD protocol includes a Stuff Count, a CRC, and a CRC Delimiter (CRC_DEL).

A value (3 bits) obtained by gray-encoding a remainder (Stuff bit count modulo 8) obtained by dividing the number of stuff bits before the CRC region by 8 and a parity bit (1 bit) of the gray-encoded value are set in a 4-bit length Stuff Count.

In the CRC (Cyclic Redundancy Check), in order to maintain a transmission quality as the data region (data field) increases, the calculation result of the transmission value including not only the bits of the data region but also the stuff count and the stuff bit from the SOF is set. When the transmission data is 16 bytes or less, a 17 bit data region is set in the CRC, and when the transmission data exceeds 16 bytes, a 21 bit data region is set in the CRC.

Similarly to the CAN protocol, in the CAN FD protocol, a bit stuffing rule is adopted from the SOF to an end of the data region (data format). In the CRC region, a fixed stuff bit is disposed at a head of the CRC region and at a fixed bit position, and a value of the fixed stuff bit is set to a value opposite to a value of a previous bit. For example, when the states at the same level on the bus signal lines 31 and 32 continue N times (for example, five times), a state bit (stuff bit) opposite to the state that has been transmitted so far is inserted. A CRC_DEL (CRC delimiter) is a field indicating the end of a CRC sequence. According to the bit stuffing rule, when the state at the same level (dominant or recessive) continues for N+1 bits (for example, 6 bits) or more on the bus signal lines 31 and 32, this is processed as a stuff error.

The ACK (ACKnowledge) region (confirmation region) in the CAN FD protocol includes the ACK and an ACK Delimiter (ACK_DEL), similarly to the CAN protocol. The ACK (ACKnowledge) is the confirmation field 610 for determining whether data up to the transmitted CRC has been normally received by the reception circuit 230 of the transmission destination node (for example, the ECU 200 to be inspected). The confirmation field is 1 bit length, the node (inspection apparatus 10) on the transmission side transmits the dominant (logical value 0), and when the node (ECU 200) on the reception side has normally received the data up to the CRC field, the node on the reception side transmits acknowledgement of the recessive (logical value 1). When the node on the reception side is malfunctioning, the acknowledgement in which the dominant (logical value 0) is set (maintained) in the confirmation field 610 is transmitted. An ACK_DEL (ACK delimiter) is a field indicating the end of an ACK field. An EOF (End Of Frame) following the ACK_DEL (ACK delimiter) is a field transmitted at the end of the data frame.

(CAN FD Extended Format)

In the extended format illustrated in the ST 64, a configuration different from the standard format (ST 63) will be described. A base ID is 11 bits length, and the ID in the standard format is referred to as the base ID in the extended format. In the extended format, the SRR (substitute remote request bit) follows the base ID, and the 1-bit length dominant signal is set. Subsequent to the SRR, the 1-bit length recessive signal (logical value 1) is set in the IDE (Identifier Extension Bit).

In the extended format, identifier field (ID field) recessive includes a 11-bit length base ID field and an 18-bit length extended ID field. That is, in the extended format, the identifier field (ID field) recessive includes a 29-bit length (=11 bits+18 bits).

[Processing Flow of Inspection]

Next, a flow of inspection processing using the inspection apparatus 10 according to the present embodiment will be described. FIG. 4 is a diagram for explaining a processing flow of inspection using the inspection apparatus 10. Processing of each portion of the functional configuration of the inspection apparatus 10 illustrated in FIG. 3 will be described together with the processing flow of inspection in FIG. 4.

In step S400, a worker (operator) who performs inspection connects the inspection apparatus 10 and the communication circuit 210 of the ECU 200 to be inspected on a one-to-one basis using the connection unit 30.

Next, in step S410, the inspection apparatus 10 is powered on. Power is supplied from the power supply unit 105 of the inspection apparatus 10 or the vehicle side to the ECU 200 to be inspected. Accordingly, CAN communication is established between the inspection apparatus 10 and the ECU 200 to be inspected.

[Inspection of Transmission Function of ECU 200]

In step S420, the initial message verification unit 110 verifies whether there is an initial message that is transmitted from the transmission circuit 220 of the ECU 200. Here, the initial message refers to a message based on a predetermined data format first transmitted from the ECU 200 after power is supplied to the ECU 200. The initial message verification unit 110 verifies whether there is the initial message that is transmitted from the transmission circuit 220 of the ECU after power is supplied from the power supply unit 105 to the ECU 200 or after power is supplied from the vehicle side to the ECU 200.

The transmission function determination unit 120 determines whether the transmission function of the transmission circuit 220 of the ECU 200 is normal by the verification (presence or absence of the initial message) by the initial message verification unit 110. When the malfunction state (abnormality) continues in the determination duration time (first determination duration time, second determination duration time), the transmission function determination unit 120 determines that the transmission function of the ECU 200 is in the malfunction state. When the initial message is output from the transmission circuit 220 of the ECU 200 in a predetermined determination duration time, the transmission function determination unit 120 determines that the transmission circuit 220 of the ECU 200 is normal. When the initial message is not output from the transmission circuit 220 of the ECU 200 in a predetermined determination duration time, the transmission function determination unit 120 determines that the transmission circuit 220 of the ECU 200 is malfunctioning. The inspection apparatus 10 according to the present embodiment can inspect the CAN communication function (transmission function) in the ECU 200 to be inspected. The verification of the presence or absence of the initial message is different in that the presence or absence of an error is not determined as in the processing of steps S820 and S870 of FIG. 8. In the present embodiment, the reception of the message is processing of acquiring the message without detecting any error among a CRC error, a form error, and a staff error as described later in step S435, and in this respect, the verification of the presence or absence of the initial message is distinguished from the reception of the message.

Then, in step S430, the transmission function determination unit 120 displays the determination result on a display unit (not illustrated) of the inspection apparatus 10. The configuration of the display unit may be, for example, an indicator capable of visually recognizing the determination result, or the determination result may be displayed using a display device such as a liquid crystal or an organic EL. The present invention is not limited to the visual display, and for example, a notification sound at the time of normality determination and a notification sound at the time of malfunction may be switched and notified from a speaker (sound source) (not illustrated). As a result, the worker (operator) who performs the inspection can visually or audibly confirm the determination result of the inspection apparatus 10.

[Inspection of Reception Function of ECU 200]

The inspection apparatus 10 determines a transmission speed (bit rate: S435) and a data format in the CAN communication based on a message transmitted from the ECU 200 in order to inspect the reception function of the ECU 200 (S440). The inspection apparatus 10 determines the bit rate and the format of a message based on a message (an initial message that is output first, or a message that is transmitted after the initial message) received from the transmission circuit 220 of the ECU 200.

(Determination of Bit Rate (Reception of Message))

Figure 8:
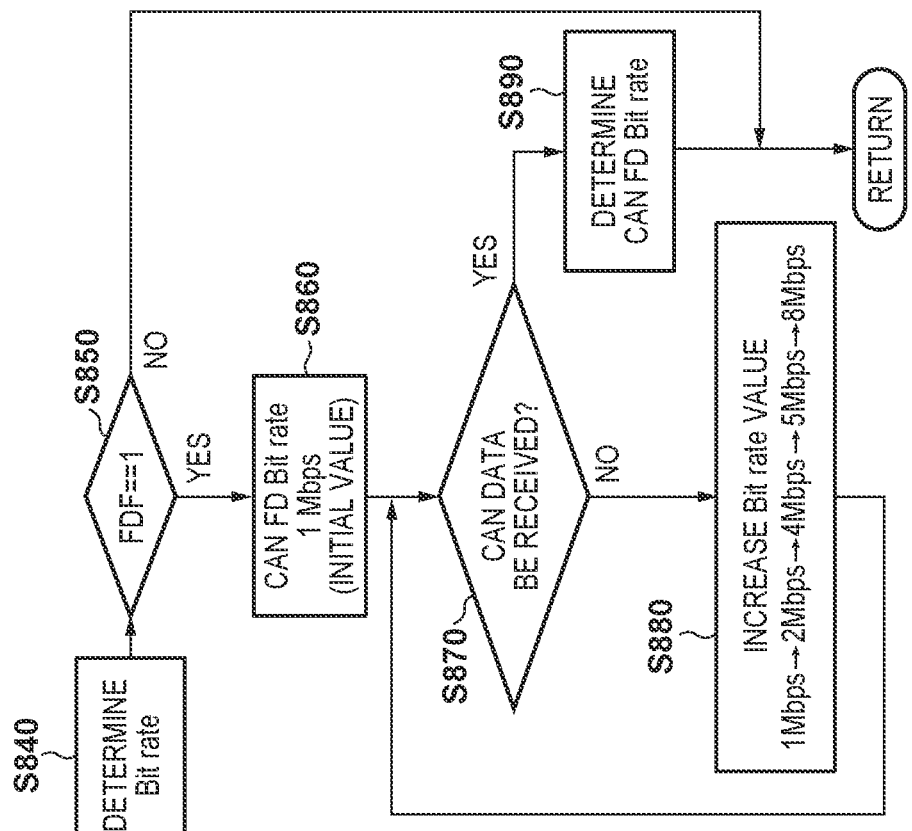
FIG. 8 is a diagram for explaining a flow of bit rate determination processing.

In step S435, the reception unit 150 determines the transmission speed (bit rate) in the CAN communication based on the message received from the ECU 200. By performing processing of determining the transmission speed (bit rate) of the message, it is possible to receive the message from the ECU 200 without an error, and it is possible to accurately determine the data format in the subsequent step S440. FIG. 8 is a diagram for explaining a specific flow of the processing of determining the transmission speed (bit rate).

In step S810, the reception unit 150 sets 1 Mbps as an initial value of the bit rate.

In step S820, the reception unit 150 determines whether the message from the ECU 200 can be received based on the setting of the initial value (S810). When the CRC calculated based on the message does not match the value of the CRC included in the message, the reception unit 150 sets the CRC error (NO in S820), and advances the processing to step S830.

The CRC_DEL (CRC delimiter), the ACK_DEL (ACK delimiter), and the EOF in the message are usually determined as the recessive (logical value 1), and, here, when the dominant (logical value 0) is detected, the processing proceeds to step S830 as the form error (NO in S820).

The reception unit 150 monitors whether the bit stuffing rule is complied with, and when the state of the same level on the bus signal lines 31 and 32 continues for a predetermined bit (for example, 6 bits) or more, the reception unit 150 sets the stuff error (NO in S820), and advances the processing to step S830.

When at least one of the CRC error, the form error, and the staff error is detected, the reception unit 150 advances the processing to step S830.

In step S830, the reception unit 150 decreases the bit rate of the initial value (1 Mbps→500 Kbps) and determines whether the message can be received (S820). When the message cannot be received (NO in S820), the reception unit 150 sequentially decreases the value of the bit rate (500 Kbps→250 Kbps→125 Kbps) and determines whether the message can be received (S820).

When none of the CRC error, the form error, and the staff error is detected, the reception unit 150 determines that the message can be received (YES in S820), and advances the processing to step S840.

In step S840, the reception unit 150 determines the bit rate at which the message can be received without an error. For example, when the message can be received without detecting any of the CRC error, the form error, and the staff error in the setting of 250 Kbps, the reception unit 150 determines the bit rate of the message to be 250 Kbps.

Next, in step S850, the reception unit 150 determines whether the value of the FDF of the format of the message is 1, and when the value of the FDF is not 1 (NO in S850), this processing returns to step S435. In this case, the transmission speed (bit rate) in the CAN protocol is the value determined in step S840. On the other hand, when it is determined in step S850 that FDF=1 (YES in S850), the processing proceeds to step S860.

In step S860, the reception unit 150 sets 1 Mbps as an initial value of the bit rate of the CAN FD protocol.

In step S870, the reception unit 150 determines whether the message from the ECU 200 can be received based on the setting of the initial value (S860). The reception unit 150 determines the presence or absence of an error in the same manner as the determination processing in step S820. In step S870, when at least one of the CRC error, the form error, and the staff error is detected, the reception unit 150 advances the processing to step S880.

In step S880, the reception unit 150 increases the bit rate of the initial value (1 Mbps→2 Mbps) and determines whether the message can be received (S870). When the message cannot be received (NO in S870), the reception unit 150 sequentially increases the value of the bit rate (2 Mbps→4 Mbps→5 Mbps→8 Mbps) and determines whether the message can be received (S870).

When none of the CRC error, the form error, and the staff error is detected, the reception unit 150 determines that the message can be received (YES in S870), and advances the processing to step S890.

In step S890, the reception unit 150 determines the bit rate at which the message can be received without an error. For example, when the message can be received without detecting any of the CRC error, the form error, and the staff error at 8 Mbps, the reception unit 150 determines the bit rate of the message to be 8 Mbps. Then, after step S890, this processing returns to step S435. In this case, the transmission speed (bit rate) in the CAN FD protocol is the value determined in step S890. The transmission speed (bit rate) determination processing ends through the above processing.

(Determination of Data Format)

In step S440, the reception unit 150 determines the data format of the message transmitted from the ECU 200. FIG. 9 is a diagram for explaining a specific flow of processing of determining the data format.

In step S435, the reception unit 150 determines the bit rate. This processing is the processing described above with reference to FIG. 8, and the reception unit 150 acquires the transmission speed (bit rate) of the transmitted message based on the processing in step S435.

In step S910, the reception unit 150 determines whether the signal set in the IDE of the message is the dominant. When the signal set to the IDE is the dominant (IDE=0) (True in S910), the reception unit 150 advances the processing to S920.

In step S920, the reception unit 150 determines whether the signal set in the FDF of the message is the dominant. When the signal set to the FDF is the dominant (FDF=0) (True in S920), the reception unit 150 advances the processing to S940.

Then, in step S940, the reception unit 150 determines the format of the received message as the standard format of the CAN protocol (11 bit CAN).

On the other hand, when it is determined in step S920 that the signal set to the FDF is the recessive (FDF=1) (False in S920), the reception unit 150 advances the processing to S950.

Then, in step S950, the reception unit 150 determines the format of the received message as the standard format of the CAN FD protocol (11 bit CAN FD).

On the other hand, when it is determined in step S910 that the signal set to the IDE is the recessive (IDE=1) (False in S910), the reception unit 150 advances the processing to S930.

In step S930, the reception unit 150 determines whether the signal set in the FDF of the message is the dominant. When the signal set to the FDF is the dominant (FDF=0) (True in S930), the reception unit 150 advances the processing to S960.

Then, in step S960, the reception unit 150 determines the format of the received message as the extended format of the CAN protocol (29-bit CAN).

On the other hand, when it is determined in step S930 that the signal set to the FDF is the recessive (FDF=1) (False in S930), the reception unit 150 advances the processing to S970.

Then, in step S970, the reception unit 150 determines the format of the received message as the extended format of the CAN FD protocol (29-bit CAN FD). The format determination processing ends through the above processing.

(Generation of Inspection Message 600)

In step S450, based on the determination result (S435) of the transmission speed (bit rate) and the determination result (S440) of the data format, the inspection message creation unit 130 creates the inspection message 600 corresponding to the communication protocol of the ECU 200 to be inspected. By the processing in this step, the inspection message creation unit 130 creates the inspection message 600 in which a predetermined signal level is set in the confirmation field 610 of the data format corresponding to the message received from the ECU 200 to be inspected.

The reception function determination unit 170 of the inspection apparatus 10 determines the reception function of the ECU 200 based on whether the signal level (logical value) set in the confirmation (ACK) field 610 of the inspection message 600 (FIGS. 6A and 6B) is changed (inverted) in the response message from the ECU 200. FIG. 5 is a diagram schematically illustrating a flow from the reception of the message transmitted from the ECU 200 (determination of the bit rate: S435) to the determination of the data format of the message (S440) to the creation of the inspection message 600 (S450) to the transmission of the inspection message 600 (S460).

Although there are a large variety of data formats of the message in the CAN communication, in the inspection apparatus 10 according to the present embodiment, a different data format is stored for each ECU to be inspected, the data format can be automatically determined, and the inspection message corresponding to the communication protocol of the ECU 200 to be inspected can be created based on the determination result (S435) of the transmission speed (bit rate) and the determination result (S440) of the data format. As a result, it is possible to perform the inspection in a shorter time while reducing the burden on the worker as compared with a case where the worker (operator) who performs the inspection prepares the specification of the ECU 200 to be inspected according to the inspection.

In order to perform the data format determination processing, the inspection message creation unit 130 according to the present embodiment includes an accumulation unit 133 and a selection unit 135 (FIG. 3). The accumulation unit 133 accumulates the data formats classified based on a combination of a plurality of communication protocol types, frame rates, and transmission speeds, and the selection unit 135 selects, from the accumulation unit 133, the data format corresponding to the message received from the transmission circuit 220 of the ECU 200. The accumulation unit 133 is, for example, a recording medium capable of holding various data formats in a nonvolatile manner, and is realized by, for example, a hard disk device, a flash memory, and the like.

The accumulation unit 133 accumulates, for example, the data formats classified based on a combination of the communication protocol types (for example, CAN, CAN FD, and the like), the frame rates (for example, 11 bits, 29 bits, and the like), and the transmission speeds (for example, CAN: 125 Kbps, 250 Kbps, 500 Kbps, 1 Mbps; CANFD: 1 Mbps, 2 Mbps, 4 Mbps, 5 Mbps, 8 Mbps, and the like). The classification example of the data format is exemplary and is not limited to this example.

The inspection message creation unit 130 creates the inspection message 600 (FIGS. 6A and 6B) based on the data format selected by the selection unit 135. For example, when the selection unit 135 selects the data format of the communication protocol type (CAN FD), the frame rate (29 bits), and the transmission speed (8 Mbps) from the accumulation unit 133, the inspection message creation unit 130 creates the inspection message based on the data format selected by the selection unit 135.

In this step, the inspection message creation unit 130 creates the inspection message 600 corresponding to the data format of each of the ECUs 200 to be inspected by the automatic discrimination function of the data format. In order to determine whether the inspection message 600 has normally received by the reception circuit 230 of the ECU 200, the inspection message creation unit 130 creates the inspection message 600 in which the predetermined signal level is set in the confirmation field (ACK field) 610 of the data format.

In the present embodiment, for example, the inspection message creation unit 130 creates the inspection message 600 in which the logical value 0 (dominant level) as the predetermined signal level is set in the confirmation field (ACK field) 610.

(Transmission of Inspection Message 600)

In step S460, a transmission unit 140 transmits the inspection message 600 created by the inspection message creation unit 130 to the reception circuit 230 of the ECU 200. The transmission unit 140 transmits the inspection message 600 to the ECU 200 according to the transmission speed determined in S435.

The ECU 200 processes the received inspection message 600 by the reception circuit 230, and transmits the response message as a response to the inspection message 600 to the inspection apparatus 10. FIG. 7 is a diagram schematically illustrating a flow from the reception of the response message transmitted from the ECU 200 (S470) to the confirmation of the signal level in the confirmation field (ACK field) in the response message (S480) to the determination of the reception function (S490).

(Reception of Response Message)

In step S470, the reception unit 150 receives the response message to the inspection message 600 from the transmission circuit 220 of the ECU 200.

(Confirm Setting of Confirmation (ACK) Field)

In the communication protocol of the CAN, there is a rule that the ECU responds by changing (inverting) the signal level of the confirmation field (ACK field) 610 after receiving the message. In the present embodiment, using this rule, in order to determine whether the reception function in the ECU 200 is normal, the confirmation unit 160 confirms whether the signal level of the confirmation field (ACK field) has been changed (inverted). The change (inversion) is, for example, a change in the signal level from the logical value 0 (dominant level) to the logical value 1 (recessive level). The confirmation field 610 is 1 bit length, the inspection apparatus 10 as the node on the transmission side transmits the dominant (logical value 0), and w % ben the ECU 200 as the node on the reception side has normally received the data up to the CRC field, the ECU 200 transmits acknowledgement of the recessive (logical value 1). When the transmission function (reception function) of the ECU 200 on the receiving side is malfunctioning, the acknowledgement in which the dominant (logical value 0) is set (maintained) in the confirmation field 610 is transmitted.

In step S480, the confirmation unit 160 confirms whether the signal level of the confirmation field (ACK field) in the response message has been changed with respect to the setting of the signal level of the confirmation field (ACK field) in the inspection message 600. In the inspection message 600 according to the embodiment, it is assumed that the logical value 0 (dominant level) is set as a predetermined signal level for the signal level of the confirmation field (ACK field).

The confirmation unit 160 confirms whether the signal level of the confirmation field (ACK field) in the response message has been changed with respect to the setting of the inspection message 600. That is, it is confirmed (determined) whether the setting of the logical value 0 (dominant level) is changed to the logical value 1 (recessive level) or whether the setting of the logical value 0 (dominant level) is maintained.

(Determination Processing of Reception Function)

In step S490, the reception function determination unit 170 determines whether the reception function of the reception circuit 230 of the ECU 200 is normal based on the confirmation of the confirmation unit 160. In this step, the reception function determination unit 170 determines that the communication function (reception function) of the ECU 200 is normal when a state in which the signal level of the confirmation field 610 in the response message is changed with respect to the setting of the inspection message 600 continues in the first determination duration time or the second determination duration time. Furthermore, when a state in which the signal level of the confirmation field 610 in the response message is maintained with respect to the setting of the inspection message continues in the first determination duration time or the second determination duration time, the reception function determination unit 170 determines that the communication function (reception function) of the ECU 200 is in the malfunction state. When the reception circuit 230 of the ECU 200 normally performs the reception processing of the inspection message, the value of the confirmation field (ACK field) is converted into the reception signal RXD in which the logical value 0 (dominant level) is changed (inverted) to the logical value 1 (recessive level), and the converted reception signal RXD is output to a controller 240.

The controller 240 generates a response message (TXD) based on the reception signal RXD and outputs the response message to the transmission circuit 220. In the response message transmitted from the transmission circuit 220, a value of the confirmation field (ACK field) reflecting the result of the conversion processing in the reception circuit 230 is set.

When the reception function in the reception circuit 230 is normal according to the rule of the communication protocol of the CAN, the signal level of the confirmation field (ACK field) 600 in the response message is changed (inverted) from the logical value 0 (dominant level) to the logical value 1 (recessive level). In this case, the reception function determination unit 170 determines that the reception function in the ECU 200 (reception circuit 230) is normal. On the other hand, when a malfunction occurs in the reception function of the ECU 200 (reception circuit 230), the signal level of the confirmation field (ACK field) 610 in the response message is maintained at the logical value 0 (dominant level). In this case, the reception function determination unit 170 determines that the reception function in the ECU 200 (reception circuit 230) is malfunctioning. The reception function determination unit 170 determines that the reception function of the ECU 200 is normal when the state in which the signal level of the confirmation field in the response message is changed with respect to the setting of the inspection message 600 continues in the first determination duration time or the second determination duration time set by the determination time change unit 180. Furthermore, when the state in which the signal level of the confirmation field in the response message is maintained with respect to the setting of the inspection message 600 continues in the first determination duration time or the second determination duration time, the reception function determination unit 170 determines that the reception function of the ECU 200 is in the malfunction state.

In step S495, the reception function determination unit 170 displays the determination result on the display unit (not illustrated) of the inspection apparatus 10. The display of the determination result is similar to step S430. A series of inspection flows by the inspection apparatus 10 ends to the above processing.

(Modifications)

The change (inversion) of the signal level in the confirmation field 610 is not limited to the above embodiment, and may be a change of the signal level from the logical value 1 (recessive level) to the logical value 0 (dominant level). In this case, the inspection apparatus 10 as the node on the transmission side transmits the recessive (logical value 1), and when the ECU 200 as the node on the reception side has normally received the data up to the CRC field, the ECU 200 transmits acknowledgement of the dominant (logical value 0). When the transmission function (reception function) of the ECU 200 on the receiving side is malfunctioning, the acknowledgement in which the recessive (logical value 1) is set (maintained) in the confirmation field 610 is transmitted.

In this case, the confirmation unit 160 may confirm (determine) whether the setting of the logical value 1 (recessive level) is changed to the logical value 0 (dominant level) or whether the setting of the logical value 1 (recessive level) is maintained in the response message.

Summary of Embodiment

The above embodiment discloses at least the following inspection apparatus (10) and inspection method.

Configuration 1. The inspection apparatus according to the above embodiment is an inspection apparatus (10) that inspects a CAN communication function of an ECU (200) to be inspected, the inspection apparatus including:
- a connection unit (30) that connects a communication circuit of the ECU and the inspection apparatus on a one-to-one basis;
- an inspection message creation unit (130) that creates an inspection message in which a predetermined signal level is set in a confirmation field of a data format corresponding to a message received from the ECU to be inspected;
- a transmission unit (140) that transmits the inspection message to the ECU;
- a reception unit (150) that receives a response message to the inspection message from the ECU;
- a confirmation unit (160) that confirms whether a signal level of the confirmation field in the response message is changed with respect to setting of the inspection message; and
- a reception function determination unit (170) that determines whether a reception function of the ECU is normal based on the confirmation of the confirmation unit.

According to the inspection apparatus of the configuration 1, it is possible to inspect the CAN communication function (reception function) in the ECU to be inspected. As a result, the CAN communication function (reception function) in the ECU to be inspected can be inspected without performing inspection by non-defective product replacement, and it is possible to reduce the cost of a non-defective device prepared for the inspection and to reduce the number of work steps required for device replacement work in inspection work.

Configuration 2. The inspection apparatus according to the above embodiment further includes: a power supply unit (105) that supplies power to the ECU;
- an initial message verification unit (110) that verifies whether there is an initial message that is transmitted from the ECU of the ECU; and a transmission function determination unit (120) that determines whether a transmission function of the ECU is normal by verifying the presence or absence of the initial message by the initial message verification unit, wherein the initial message verification unit (120) verifies the presence or absence of the initial message that is transmitted from the ECU after the power is supplied from the power supply unit to the ECU or after the power is supplied from a vehicle side to the ECU.

According to the inspection apparatus of the configuration 2, it is possible to inspect the CAN communication function (transmission function) in the ECU to be inspected. As a result, the CAN communication function (transmission function) in the ECU to be inspected can be inspected without performing inspection by non-defective product replacement, and it is possible to reduce the cost of a non-defective device prepared for the inspection and to reduce the number of work steps required for device replacement work in inspection work.

The configuration 3. The inspection message creation unit (130) further includes:

an accumulation unit (133) that accumulates a data format classified based on a combination of a communication protocol type, a frame rate, and a transmission speed; and a selection unit (135) that selects, from the accumulation unit, the data format corresponding to the message received from the ECU, wherein the inspection message creation unit (130) creates the inspection message based on the data format selected by the selection unit.

According to the inspection apparatus of the configuration 3, the data format of the message received from the ECU is automatically determined, and the inspection message of the data format corresponding to the message received from the ECU can be created based on the determination result. As a result, it is possible to perform the inspection in a shorter time while reducing the burden on a worker as compared with a case where the worker (operator) who performs the inspection prepares the specification of the ECU to be inspected according to the inspection.

Configuration 4. The inspection apparatus (10) according to the above embodiment further includes a determination time change unit (180) that changes a determination duration time for determining whether the CAN communication function is normal, from a first determination duration time to a second determination duration time shorter than the first determination duration time, by an input from sensitivity changeover means.

Configuration 5. The reception function determination unit (170) determines whether the reception function of the ECU is normal based on the first determination duration time, and when the determination time is changed by the determination time change unit, the reception function determination unit determines whether the reception function of the ECU is normal based on the second determination duration time.

Configuration 6. The reception function determination unit (170) determines that the reception function of the ECU is normal when the state in which the signal level of the confirmation field in the response message is changed with respect to the setting of the inspection message continues in the first determination duration time or the second determination duration time, and the reception function determination unit determines that the reception function of the ECU is in a malfunction state when the state in which the signal level of the confirmation field in the response message is maintained with respect to the setting of the inspection message continues in the first determination duration time or the second determination duration time.

According to the inspection apparatus of the configuration 4, the configuration 5, and the configuration 6, it is possible to detect continuous abnormality detection in a short sampling time even for the ECU in an operating state in which a failure state is unlikely to occur continuously.

Configuration 7. The inspection method according to the above embodiment is an inspection method for an inspection apparatus (10) that is connected to a communication circuit of an ECU to be inspected via a connection unit (30) on a one-to-one basis and inspects a CAN communication function of the ECU to be inspected, the inspection method including:

creating, by an inspection message creation unit (130) of the inspection apparatus, an inspection message in which a predetermined signal level is set in a confirmation field of a data format corresponding to a message received from the ECU to be inspected (S450);

transmitting, by a transmission unit (140) of the inspection apparatus, the inspection message to the ECU (S460);

receiving, by a reception unit (150) of the inspection apparatus, a response message to the inspection message from the ECU (S470);

confirming, by a confirmation unit (160) of the inspection apparatus, whether a signal level of the confirmation field in the response message is changed with respect to setting of the inspection message (S480); and determining, by a reception function determination unit (170) of the inspection apparatus, whether a reception function of the ECU is normal based on a result of the confirmation in the confirmation step (S490).

According to the inspection method of the configuration 7, it is possible to inspect the CAN communication function (reception function) in the ECU to be inspected. As a result, the CAN communication function (reception function) in the ECU to be inspected can be inspected without performing inspection by non-defective product replacement, and it is possible to reduce the cost of a non-defective device prepared for the inspection and to reduce the number of work steps required for device replacement work in inspection work.

Other Embodiments

In the present invention, it is also possible to supply a program for realizing the functions of the above-described embodiment to a system or an inspection apparatus constituting the system via a network or a storage medium, and one or more processors in a computer of the inspection apparatus can read the program to execute processing of the inspection apparatus.

The invention is not limited to the foregoing embodiments, and various variations/changes are possible within the spirit of the invention.

What is claimed is:

1. An inspection apparatus that inspects a controller area network (CAN) communication function of an electronic control unit (ECU) to be inspected, the inspection apparatus comprising:

at least one of (a) one or more processors connected to one or more memories storing a program including instructions executed by the one or more processors and (b) circuitry configured to function as:

connecting a communication circuit of the ECU and the inspection apparatus on a one-to-one basis;

creating an inspection message in which a predetermined signal level is set in a confirmation field of a data format corresponding to a message received from the ECU to be inspected;

transmitting the inspection message to the ECU;

receiving a response message corresponding to the inspection message from the ECU;

confirming whether a signal level of the confirmation field in the response message is changed with respect to setting of the inspection message; and determining whether a reception function of the ECU is normal based on the confirmation of the confirming.

2. The inspection apparatus according to claim 1, further comprising a power supply device, wherein the at least one of (a) one or more processors and (b) circuitry is further configured to function as:

supplying power to the ECU;

verifying whether there is an initial message that is transmitted from the ECU; and determining whether a transmission function of the ECU is normal by verifying the presence or absence of the initial message by the verifying, wherein the at least one of (a) one or more processors and (b) circuitry is configured to function as verifying the presence or absence of the initial message that is transmitted from the ECU after the power is supplied from the power supply device to the ECU or after the power is supplied from a vehicle side to the ECU.

3. The inspection apparatus according to claim 2, wherein the at least one of (a) one or more processors and (b) circuitry is further configured to function as:

accumulating a data format classified based on a combination of a communication protocol type, a frame rate, and a transmission speed; and selecting, from a plurality of data formats accumulated by the accumulating, the data format corresponding to the message received from the ECU, wherein the at least one of (a) one or more processors and (b) circuitry is configured to function as creating the inspection message based on the data format selected by the selecting.

4. The inspection apparatus according to claim 1, further comprising a sensitivity changeover switch, wherein the at least one of (a) one or more processors and (b) circuitry is further configured to function as changing a determination duration time for determining whether the CAN communication function is normal, from a first determination duration time to a second determination duration time shorter than the first determination duration time, by an input from the sensitivity changeover switch.

5. The inspection apparatus according to claim 4, wherein the at least one of (a) one or more processors and (b) circuitry is configured to function as determining whether the reception function of the ECU is normal based on the first determination duration time, and when the determination time is changed by the changing the at least one of (a) one or more processors and (b) circuitry is configured to function as determining whether the reception function of the ECU is normal based on the second determination duration time.

6. The inspection apparatus according to claim 4, wherein the at least one of (a) one or more processors and (b) circuitry is configured to function as:

determining that the reception function of the ECU is normal when the state in which the signal level of the confirmation field in the response message is changed with respect to the setting of the inspection message continues in the first determination duration time or the second determination duration time, and determining that the reception function of the ECU is in a malfunction state when the state in which the signal level of the confirmation field in the response message is maintained with respect to the setting of the inspection message continues in the first determination duration time or the second determination duration time.

7. An inspection method for an inspection apparatus that is connected to a communication circuit of an electronic control unit (ECU) to be inspected via a connection unit on a one-to-one basis and inspects a controller area network (CAN) communication function of the ECU to be inspected, the inspection method comprising the steps of:

creating an inspection message in which a predetermined signal level is set in a confirmation field of a data format corresponding to a message received from the ECU to be inspected;

transmitting the inspection message to the ECU;

receiving a response message corresponding to the inspection message from the ECU;

confirming whether a signal level of the confirmation field in the response message is changed with respect to setting of the inspection message; and determining whether a reception function of the ECU is normal based on a result of the confirmation in the confirmation step.

* * * * *